(12) United States Patent
Miyoshi et al.

(10) Patent No.: US 6,901,451 B1
(45) Date of Patent: May 31, 2005

(54) PCI BRIDGE OVER NETWORK

(75) Inventors: Takashi Miyoshi, San Jose, CA (US);
Jeffrey D. Larson, San Jose, CA (US);
Hirohide Sugahara, Kawasaki (JP);
Takeshi Horie, Palo Alto, CA (US)

(73) Assignee: Fujitsu Limited (JP)

( * ) Notice: Subject to any disclaimer, the term of this patent is extended or adjusted under 35 U.S.C. 154(b) by 768 days.

(21) Appl. No.: 09/703,477

(22) Filed: Oct. 31, 2000

(51) Int. Cl.⁷ .......................... G06F 15/16; G06F 13/36
(52) U.S. Cl. ................. 709/232; 709/250; 710/310; 710/313
(58) Field of Search .................. 709/232–235, 709/250, 253; 710/310, 313, 117, 315; 714/9

(56) References Cited

U.S. PATENT DOCUMENTS

| | | | | |
|---|---|---|---|---|
| 5,621,898 A | * | 4/1997 | Wooten | 710/117 |
| 5,764,924 A | * | 6/1998 | Hong | 710/315 |
| 6,148,414 A | * | 11/2000 | Brown et al. | 714/9 |
| 6,170,025 B1 | | 1/2001 | Drottar et al. | |
| 6,205,508 B1 | | 3/2001 | Bailey et al. | |
| 6,233,636 B1 | | 5/2001 | Kelley et al. | |
| 6,243,781 B1 | * | 6/2001 | Gandhi et al. | 710/313 |
| 6,487,628 B1 | * | 11/2002 | Duong et al. | 710/313 |
| 6,502,157 B1 | * | 12/2002 | Batchelor et al. | 710/310 |

OTHER PUBLICATIONS

Intel Corporation, "Getting Started with the 21554 Embedded PCI–to–PCI Bridge," Application Note, 14 pages, Order No. 278210–001, Sep. 1998.

* cited by examiner

*Primary Examiner*—Patrice Winder
(74) *Attorney, Agent, or Firm*—Fenwick & West LLP

(57) ABSTRACT

One embodiment of the present invention provides a method for communicating transaction request information from a PCI environment over a network. Another embodiment of the present invention provides a method for communicating request packet information from a network to a PCI environment. Another embodiment of the present invention provides a system for communicating transaction request information from a PCI environment over a network. Another embodiment of the present invention provides a system for communicating request packet information from a network to a PCI environment.

26 Claims, 13 Drawing Sheets

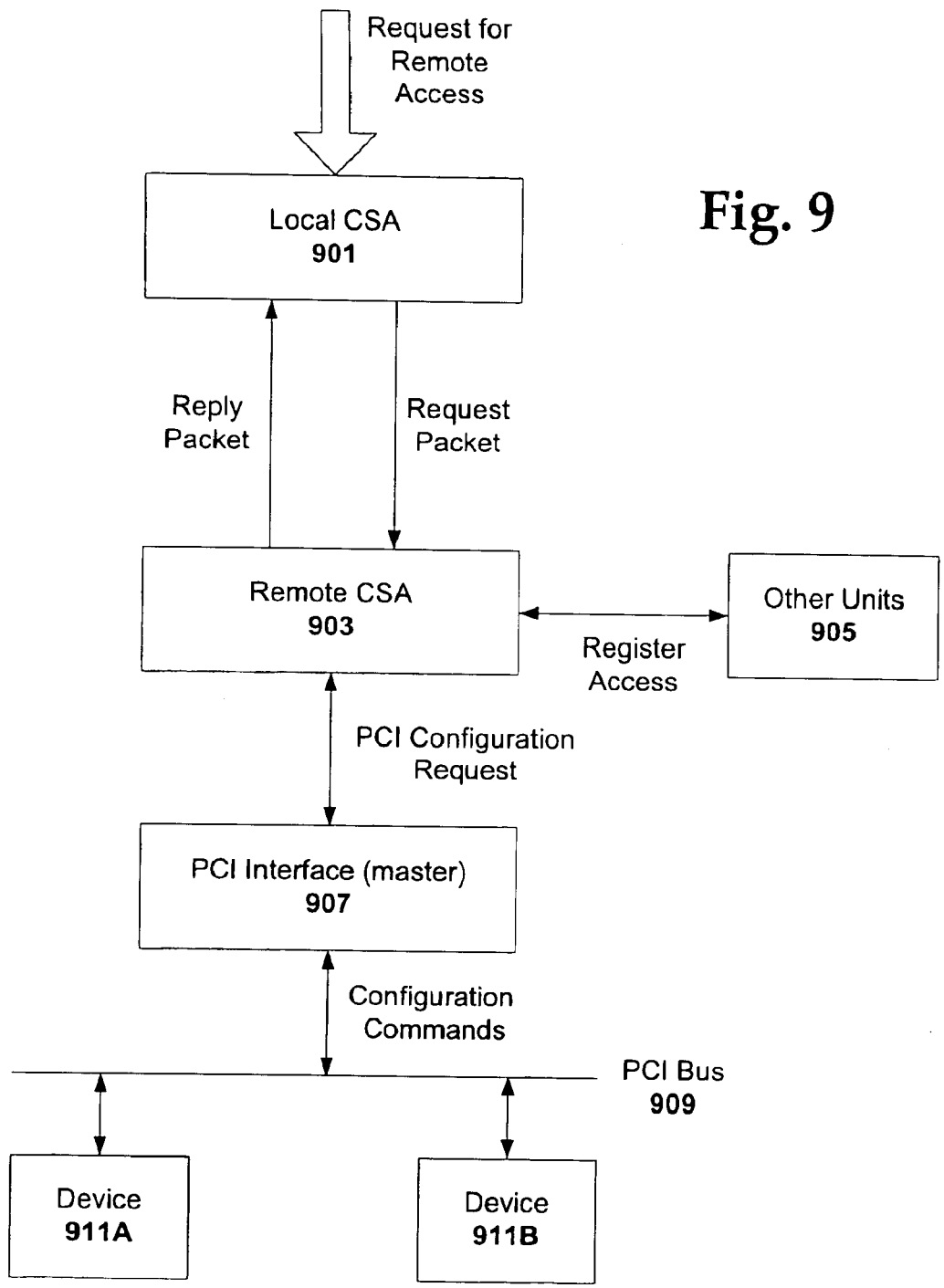

PCI BRIDGE OVER NETWORK

BACKGROUND OF THE INVENTION

1. Field of Invention

This invention relates to PCI communications, and more specifically, to transferring PCI bus transactions over a network.

2. Description of the Related Art

A peripheral component interconnect (PCI) bus is an expansion bus that provides a communication path between a central processing unit (CPU) and a PCI device such as a display, disk drive, or SCSI adapter. Depending on the desired system, more than one PCI bus may be necessary. For instance, attaching too many peripheral devices to one PCI bus may overload that bus and cause it to function improperly. Furthermore, two or more of the devices residing on that PCI bus may interfere with each other's respective performance. To help alleviate these problems, conventional systems incorporate a PCI-to-PCI bridge.

The PCI-to-PCI bridge connects two PCI buses thereby providing an interface for additional PCI devices. The bridge effectively places only one electrical load on the host PCI bus, and creates a new PCI bus that can support a number of additional devices as well as other PCI-to-PCI bridges thereby creating a hierarchy of buses as shown in FIG. 1. One benefit of such a system is that heavy PCI device population on one PCI bus can be redistributed to other PCI buses. Additionally, incompatible PCI devices can be isolated from one another by locating them on different PCI buses within the system. Thus, PCI bus technology has greatly expanded the ability of personal computers, workstations and servers to accommodate multiple and diverse peripheral devices without sacrificing performance due to an overloaded bus condition.

However, PCI technology is not without its problems. With the significant advances in processor clock speeds, the standard PCI operating frequency of 33 MHz seriously limits system bandwidth and is often the cause of a performance bottlenecks. Although higher operating frequencies are available (e.g., 66 MHz), they come at the cost of significantly reduced load limits for the corresponding PCI bus. Moreover, modern office computer systems and workstations interface with various I/O devices such as servers and storage units over substantial distances. PCI technology does not perform well over long distances without significantly reducing the operating frequency (below 1 MHz). This is because PCI technology is generally implemented on a printed circuit board (or series of printed circuit boards) where bus lengths are kept very short to limit the affect of parasitics. Thus, conventional PCI bus technology is inadequate to support modern processor clock speeds and geographically distributed peripheral devices.

What is needed, therefore, is a means for transferring PCI bus transactions (e.g., read and write) from a local node of a PCI bus to a PCI bus on a remote node over a network.

BRIEF SUMMARY OF THE INVENTION

One embodiment of the present invention provides a method for communicating transaction request information from a PCI environment over a network by: receiving a number of transaction requests from the PCI environment; determining a destination node ID and a destination address associated with each transaction request; maintaining an order of the transaction requests received; maintaining an order of data associated with each of the transaction requests; for each transaction request, assembling a packet including a request, a destination node ID and a destination address; and transmitting the packet to the network.

Another embodiment of the present invention provides a method for communicating request packet information from a network to a PCI environment by: receiving a number of a request packets from the network; for each request packet, identifying a request, a destination node ID and a destination address associated with the packet; maintaining an order of the requests associated with each of the request packets received; maintaining an order of data associated with each of the request packets received; and for each request packet, processing the associated request.

Another embodiment of the present invention provides a system for communicating transaction request information from a PCI environment over a network, the system including: a PCI interface for receiving transaction requests from the PCI environment and for determining a destination node ID and destination address a PCI address associated with each transaction request received; a transfer unit operatively coupled to the PCI interface for maintaining an order of the transaction requests received, and for maintaining an order of data associated with each of the transaction requests; and a network interface coupled to the transfer unit for assembling a request packet for each transaction request, each request packet including a request, a destination node ID and a destination address.

Another embodiment of the present invention provides a system for communicating request packet information from a network to a PCI environment, the system including: a network interface for receiving a number of a request packets from the network, and for each request packet, identifying a request, data, a destination node ID and a destination address associated with the packet; a receive unit for maintaining an order of the requests associated with each of the request packets received, and for maintaining an order of data associated with each of the request packets received; and a PCI interface for processing the request associated with each request packet.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

FIG. 9 is a block diagram illustrating remote register access in accordance with one embodiment of the present invention.

DETAILED DESCRIPTION OF THE INVENTION

Figure 1:
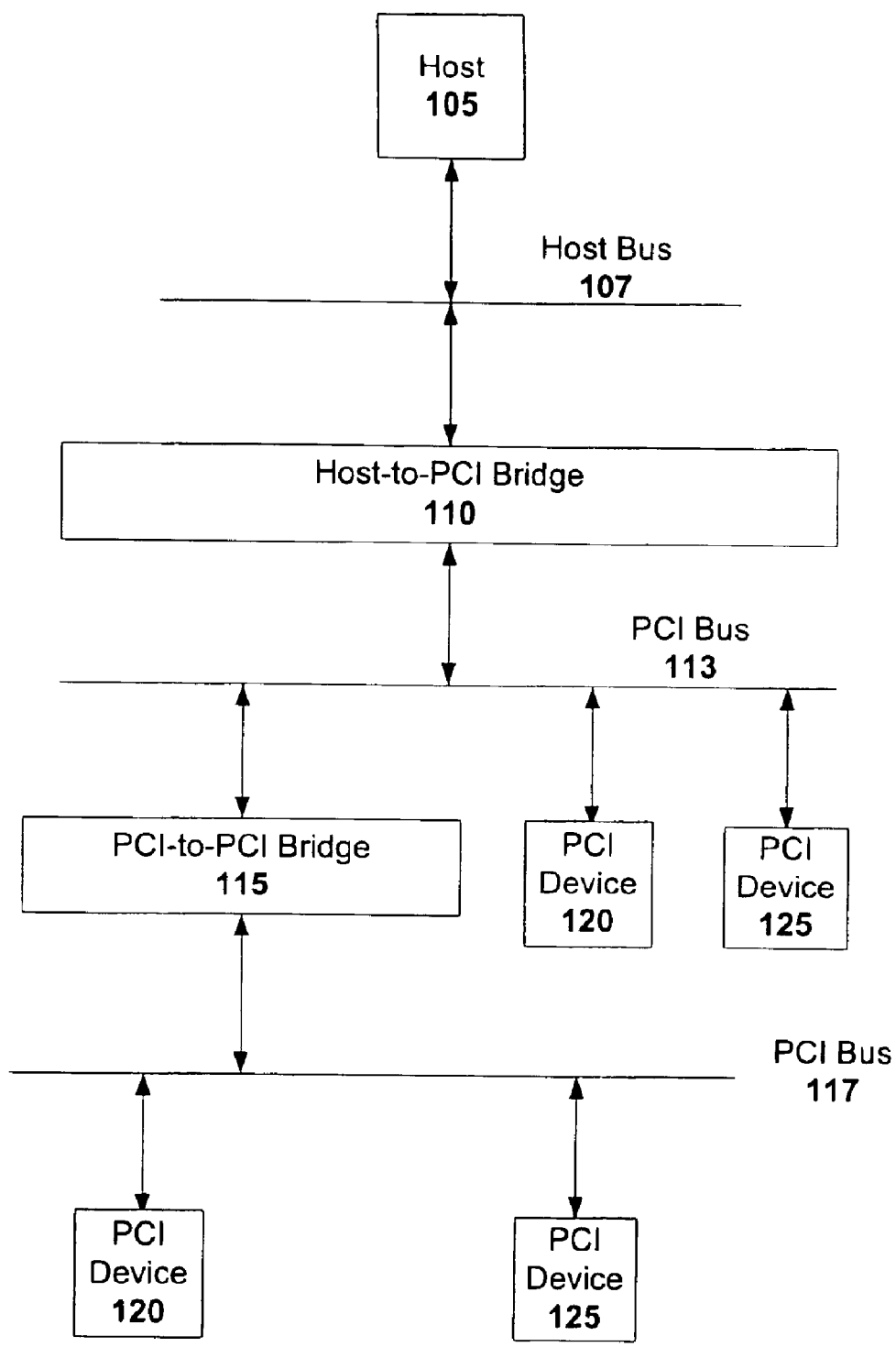
FIG. 1 is a block diagram of a conventional PCI bridge system.
Figure 2:
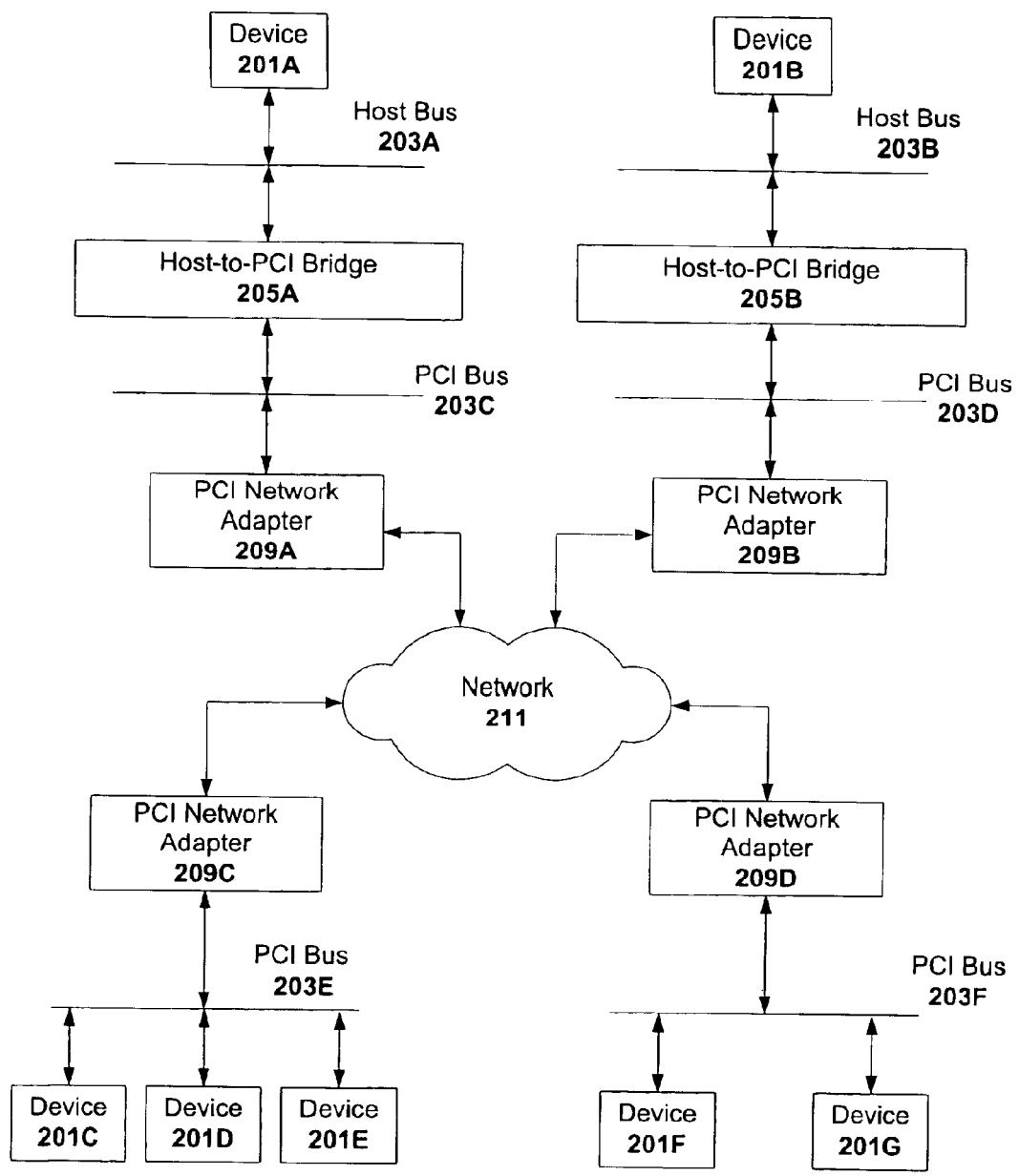
FIG. 2 is a system block diagram of a PCI bridge over a network according to one embodiment of the present invention.

Figures will now be referred to in order to assist in describing the invention. FIG. 2 is a system block diagram of a PCI bridge over a network according to one embodiment of the present invention.

Each of devices 201A through 201G is generally referred to as a device 201. They can be conventional PCI devices such as a display, a disk drive, a sound card or a SCSI adapter. Device 201 can also represent a conventional workstation, personal computer or host computer on a network, or it can represent an entire network. Alternatively, device 201 can represent a specialized node. For example, device 201 can be a data vault comprising a Direct Memory Access (DMA) device or disk controller card coupled to one or more storage devices. In short, device 201 can be any one of a number of devices or node configurations.

Each of devices 201 is coupled to a PCI bus 203. Specifically, device 201A is connected to PCI bus 203A, device 201B is connected to PCI bus 203B, devices 201C, 201D and 201E are connected to PCI bus 203E, and devices 201F and 201G are connected to PCI bus 203F. One skilled in the art will recognize that either less or more peripherals can be connected to any one PCI bus 203 depending on the desired application and system performance. For example, a PCI bus 203 might support four different PCI devices 201, just one PCI device 201 or may be unused altogether.

Host bus 203A and PCI bus 203C are coupled together via a host-to-PCI bridge 205A. Likewise, host bus 203B and PCI bus 203D are coupled together via a host-to-PCI bridge 205B. PCI network adapter 209A couples PCI bus 203C to network 211, and PCI network adapter 209B couples PCI bus 203D to network 211. Likewise, PCI network adapter 209C couples PCI bus 203E to network 211, and PCI network adapter 209D couples PCI bus 203F to network 211. The PCI network adapters are generally referred to as 209, while the host and PCI busses are generally referred to as 203. In one embodiment, network 211 includes a number of routers, each router having a number of ports, where each PCI network adapter 209 couples to a port of the router.

PCI network adapter 209 adapts the PCI environment to the network environment, and the network environment to the PCI environment, depending on the direction of data flow. Conventional PCI protocols and ordering rules are maintained with respect to the PCI environment. As such, any device 201 can communicate with another device 201 using PCI protocols. Additionally, PCI network adapter 209 allows any one device 201 to be shared by multiple hosts. For example, device 201A and device 201B could each represent a host computer that shares device 201F. PCI network adapter 209 internalizes and reconciles any incompatibilities between the PCI and network environments.

In accordance with the PCI protocol, a "master" device initiates a transaction request by issuing a PCI command (e.g., read or write or status inquiry). On the other hand, a "target" device receives the transaction request and executes a data transfer that is responsive to the transaction request. For the sake of discussion purposes, assume that a transaction request has a context that defines a first side of a transaction and a second side of a transaction, where the side initiating the transaction request is referred to as the local side, and the side receiving the transaction request is the remote side.

Local Side

A PCI network adapter 209 on the local side of a transaction can include a PCI interface means for receiving a request from PCI bus 203, as well as the address and data information associated with that request. Additionally, the PCI interface means can perform destination address and destination node ID (identification) translation. A packet header that includes the destination address and node ID information can then be formed. When a PCI network adapter 209 receives a first read request from a local device 201, it initiates prefetching of relevant data from a remote node (e.g., over network 211). While the prefetching is in process, PCI network adapter 209 issues a retry reply to the requesting local device 201 in response to retry read requests from that device. This retry reply informs the requesting local device that it must continue to retry the read request. Generally, the requesting local device 201 keeps retrying the same read command, in accordance with the PCI specification, until the read data is available at PCI network adapter 209. The read retry mechanism of PCI network adapter 209 can be used, for example, to free up the corresponding local PCI bus, and to allow other local devices 201 to issue commands during the fetch period associated with the first read request.

The local side PCI network adapter 209 can further include a mechanism for controlling the transfer of read and write requests from PCI bus 203 to a remote node over network 211. Generally, this mechanism can maintain order of the outgoing read and write requests, and can implement the transfer protocol. Additionally, the mechanism can buffer write data to be transmitted, as well as read data received from a remote node. A remote register access means for performing remote configuration may also be included in the local side PCI network adapter 209. The local side PCI network adapter 209 also includes a network interface means for assembling packets (e.g., transaction request packets) with network protocols and for receiving packets (e.g., read data) from a remote node.

Remote Side

A PCI network adapter 209 on the remote side of a transaction can include a network interface means for receiving packets (e.g., transaction request packets) from a remote node, and for assembling packets (e.g., data packets responsive to a read request from a remote node) with network protocols. Additionally, the remote side PCI network adapter 209 can include a transfer mechanism for controlling the processing of read and write requests received from network 211. This mechanism can, for example, store requested packets into memory, and can maintain ordering rules associated with read and write requests. In addition, this mechanism can request the PCI interface (local to the mechanism) to execute read and write commands.

The remote side PCI network adapter 209 can further include a PCI interface means for issuing read and write commands upon receiving a request from the transferring mechanism. The PCI interface means can also execute configuration commands responsive to the register access means of a remote PCI network adapter 209. The PCI interface means can also buffer read data to be transmitted in response to a received read request from a remote node.

General System Overview

In one embodiment, a PCI network adapter 209 allows a memory-mapped PCI read or write on one PCI bus 203 to another PCI bus 203. The target of this read or write may be either on a second PCI network adapter 209 of a remote node (e.g., over network 211) or on another PCI bus 203 of the same PCI network adapter 209. Many PCI network adapters 209 can be implemented in one system with, for example, two PCI buses 203 provided by each PCI network adapter 209. Additionally, each PCI network adapter 209 can support different types of address space. For example, one address space can be for prefetching, while another address space can be reserved for non-prefetchable data. Each type of address space can be associated with a different set of registers. Software can be used to configure the target address range depending on whether a prefetching or non-prefetching transfer is initiated.

Generally, and in one embodiment, a write transaction on a local PCI bus 203 is transferred to a remote node as a write request packet with data over network 211. The remote node issues a write command when it receives the write request packet. On the other hand, a read transaction on a local PCI bus 203 is transferred to a remote node (where the desired data resides) as a read request packet over network 211. The remote node issues a read command and returns the requested read data to the local node. While the read transaction is in process, a retry reply is generated (in response to retry read requests from the local requesting device) to indicate to the local requesting device to keep retrying its original read request. Once the requested read data is received at the local PCI network adapter 209, the local PCI network adapter 209 replies to the next read request by the local requesting device with that received data. The read transaction is thus completed.

The destination node ID of a transaction can be specified through a part of the local PCI address space. For example, the destination node ID may be mapped from a logical node ID of the local PCI address using an local indexed node ID table. The memory space that appears at the remote bus is logically generated from the local address. A configuration command is issued at the remote node by writing to (or reading from) a register or a specific address space.

If there is no intelligence on a particular PCI bus 203 to act as a configuration master, the local PCI network adapter 209 is capable of instructing a remote PCI network adapter 209 to become a master for PCI configuration reads and writes. This capability provides greater functionality to unintelligent I/O nodes containing no CPU. Such remote register access can be accomplished, for example, through a message passing scheme. The PCI network adapter 209 can observe interrupts on the PCI bus 203 and send messages on its own to remote PCI network adapters 209 that may have their own processors.

The above described functionality and components of PCI network adapter 209 (whether on the local or remote side) can be implemented in software, hardware, firmware or any combination thereof. PCI network adapter 209 will now be discussed in more detail.

Figure 3:
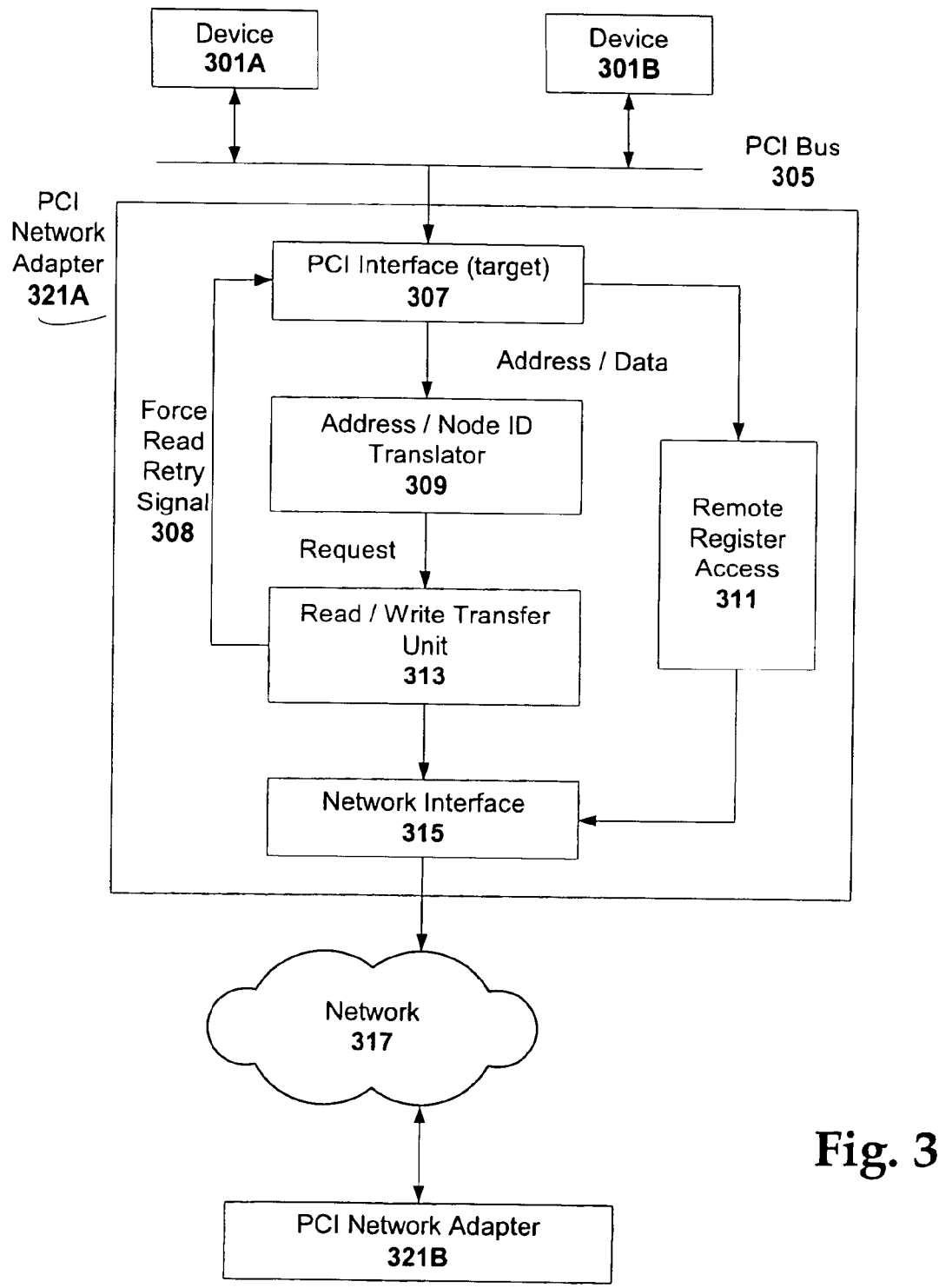
FIG. 3 is a block diagram illustrating a PCI network adapter structure on a local node according to one embodiment of the present invention.

FIG. 3 is a block diagram illustrating a PCI network adapter structure on a local node according to one embodiment of the present invention. The structure shown is referred to as PCI network adapter 321A and includes a PCI interface 307, an address/node ID translator 309, a read/write transfer unit 313, a network interface 315, and a remote register access 311. Each of these functional components can be implemented separately, or can be implemented together. For instance, PCI interface 307 address/node ID translator 309 can be implemented as one module. Moreover, each component, whether alone or in combination with other components, can be implemented, for example, in software, hardware, firmware or any combination thereof.

PCI interface 307 is coupled to PCI bus 305, which is coupled to devices 301A and 301B. Assume for the sake of discussion that either device 301A or device 301B has the capability of generating read and or write transaction requests. For example, assume that device 301A is a host computer. As such, read and write requests generated by device 301A will be received by PCI interface 307. A PCI address and data associated with the transaction request are detected by PCI interface 307, and provided to address/node ID translator 309. In this embodiment, PCI interface 307 is designated as a target function because it receives PCI commands from a PCI master device (e.g., host processor or DMA access of I/O devices).

When a read request is received by PCI interface 307, there is a period of time where the read data is not ready (e.g., during the fetch process). During this time period, a read retry mechanism can be implemented (e.g., in software, firmware, hardware or a combination thereof included in PCI network adapter 321A) so that a retry reply is generated in response to the PCI network adapter 321A receiving retry read requests from the requesting device. Such a retry reply indicates to that requesting device to continue retrying its original read request. The retrying of the read request is generally performed by the requesting device in accordance with the PCI specification. Once the requested read data is received by PCI network adapter 321A, that read data is provided via PCI interface 307 to the local requesting device in response to the next retry of the original read request. Such a read retry mechanism allows the local PCI bus to be free to process transaction requests from other devices while waiting for the read request of another device to be completed (e.g., while read data is being fetched at a remote node).

For example, assume device 301A initiates a read request for data resident on a remote node over network 317. While waiting to receive the read data from the remote node, read/write transfer unit 313 generates a force read retry signal 308, which is applied to PCI interface 307. In one embodiment, force read retry signal 308 is a control line that is transitioned from a logical low to a logical high. This high state of the force read retry signal 308 informs PCI interface 307 that the requested read data is not ready. Thus, PCI interface 307 issues a retry reply to device 301A in response to receiving a retry of the original read request from device 301A. This retry reply informs device 301A that it must continue to retry the original read request because the requested read data is not ready yet. The retry reply is generated in accordance with the PCI protocol. During this waiting time (the time for the requested read data to be ready), other devices operating on the same PCI bus (e.g., device 301B of PCI bus 305) can initiate other transaction requests (e.g., read or write or status inquiry), and these other transaction requests will not have to wait to be processed while data for the read request initiated by device 301A is being fetched. Once the requested read data is received at read/write transfer unit 313, the force read retry signal 308 is withdrawn (e.g., the control line is transitioned back to a logical low thereby indicating that the read data is available). The read data will then be returned to device 301A via PCI interface 307 the next time that device retries the original read request thereby completing the read request transaction. One benefit of the retry mechanism is that the local PCI bus remains free to process other transactions requests from other devices while read data for a particular device read request is being fetched.

Address/node ID translator 309 determines the destination node ID as well as the destination address for the requested transaction. In one embodiment, the destination node ID is specified in a portion of the local PCI address associated with the transaction request. For example, the destination node ID could be specified in the logical node ID portion of the local PCI address associated with the transaction request. Alternatively, the destination node ID can be derived from an indexed node ID table. Each entry in the table is indexed accordingly. The index corresponding to a particular entry (e.g., a destination node ID) is specified as part of the local PCI address associated with the transaction request. This latter technique adds an additional level of abstraction between the local PCI address and the destination node ID thereby providing greater scalability.

The destination address can also be derived from the local PCI address. In one embodiment, the destination address is logically generated from the local PCI address. For instance, the base address and address offset of the local PCI address can be used to logically generate a request address at the remote node. This request address is then modified by the remote base address. The resulting modified request address can then be combined with the remote address offset to logically generate the destination address.

Read/write transfer unit 313 receives the transaction request (e.g., read or write) from the address/node ID translator 309. In one embodiment, read/write transfer unit 313 might include a number of write buffers (e.g., 24 write buffers), each write buffer for holding data to be transferred to a remote node. Likewise, read/write transfer unit 313 might include a number of read buffers (e.g., 8 read buffers), each read buffer for receiving read data from a remote node. Each of these buffers might employ a first in first out (FIFO) queue structure for maintaining the order of read and write requests destined for a particular node. The order of data associated with each request can also be maintained.

In an alternative embodiment, the storage and organization of the requests and data can be implemented in a linked list of data structures. In such an embodiment, each data structure might store the transaction request (e.g., read or write), the destination node ID, the destination address and the data associated with that request. Other information, such as the address of the next request data structure and the address of the last request data structure for a particular destination node ID, can be stored in such a data structure as well. The linked list can be interrogated, sorted or otherwise manipulated according to certain parameters, such as the destination node ID.

Read/write transfer unit 313 can also be used to implement the transfer protocol. For example, once the read/write transfer unit 313 receives a write request, a comparison can be performed to determine all the stored requests having the same destination node ID associated with the newly received write request. If the number of requests for that particular destination node ID exceeds a predetermined threshold, then that new write request can be rejected (e.g., a retry reply will be returned). On the other hand, if the number of requests for a particular destination node ID is not over the predetermined threshold, read/write transfer unit 313 can further determine whether there is sufficient storage space remaining. In this embodiment, if the storage buffer (e.g., a FIFO queue or linked list of data structures) for the corresponding destination node is full, then the write request can be rejected (e.g., a retry reply will be returned). However, if there is sufficient buffer space remaining, then the write request is accepted and processed. By defining a maximum number of allowable requests for each node and monitoring buffer space, the efficiency of the system can be optimized such that no one node creates a PCI bus backlog.

With regards to a read request, once a read request for a particular destination node ID is received from the local PCI bus, read/write transfer unit 313 makes a determination as to whether the storage buffer corresponding that destination node ID is full. If the buffer is full, then read/write transfer unit 313 can essentially reject the read request by generating a force read retry signal 308, which is applied to PCI interface 307. The PCI interface will then, in response to the force read retry signal 308, issue a retry reply to the requesting device. This retry reply informs the requesting device that it must retry its read request a later time (e.g., in accordance with the PCI specification). If the buffer is not full, however, the read request can be added to the buffer. This added request would be, for example, the last request received in a FIFO queue structure, or the last data structure in a linked list. Unlike write requests, the number of read requests for a particular node ID need not be less than some predetermined threshold. This is due, in part, to the read retry mechanism, which will not allow a backlog of reads to occur on a remote node as explained above.

Remote register access 311 allows for remote configuration. For example, remote PCI network adapter 321B can be instructed to become a master for PCI configuration reads and writes. This capability affords unintelligent I/O nodes containing no CPU greater functionality. Remote register access 311 is implemented, for example, in software, hardware, firmware or any combination thereof. In one embodiment, remote register access 311 activates a message passing function. Alternatively, remote register access 311 activates a raw packet launch.

Message Passing

Software running on the requesting device provides a descriptor, which essentially is a data structure including request information such as a command (e.g., read/write), a target node ID, a target register address and a local address where reply data (e.g., resulting from remote register access) is stored. The software activates message passing by accessing a control register included in remote register access 311. Remote register access 311 reads the descriptor from memory (e.g., included on the local PCI bus), interprets the information included in the descriptor, and issues a request packet to the remote node. This request packet is referred to as a control state access (CSA) packet. At the remote side, the remote register access 407 (FIG. 4) receives the CSA packet, and interprets the command and the register address. If the register address is aimed at reserved address space, remote register access 407 issues a configuration command to the PCI bus 413. Otherwise, remote register access 407 executes internal register access. Remote register access 407 then returns a reply packet to the initiator. When remote register access 311 receives the reply packet, it stores the associated data into a memory address as specified by the CSA packet.

Raw Packet Launch

A raw packet launch scheme is similar to a message passing scheme. However, instead of using a descriptor, software prepares a raw packet in remote register access 311 through register access. The packet information is set internally by register access 311. This raw packet includes a command (e.g., read/write), a target node ID, and a target register address. There is no need for a local address where reply data is stored because the resulting reply data is stored in a control register included in remote register access 311. Software activates a raw packet launch by accessing a control register included in remote register access 311. Remote register access 311 then issues the raw packet to the remote node. At the remote side, the remote register access 407 (FIG. 4) receives the raw packet, and interprets the command and the register address. If the register address is aimed at reserved address space, remote register access 407 issues a configuration command to the PCI bus 413. Otherwise, remote register access 407 executes internal register access. Remote register access 407 then returns a reply packet to remote register access 311, which stores the associated data. Such a method has an advantage of not requiring memory space (e.g., included on the local PCI bus) as needed for a message passing technique.

Network interface 315 assembles read and write request packets, as well as message passing packets using network protocols. The resulting packets are then transmitted onto network 317.

Figure 4:
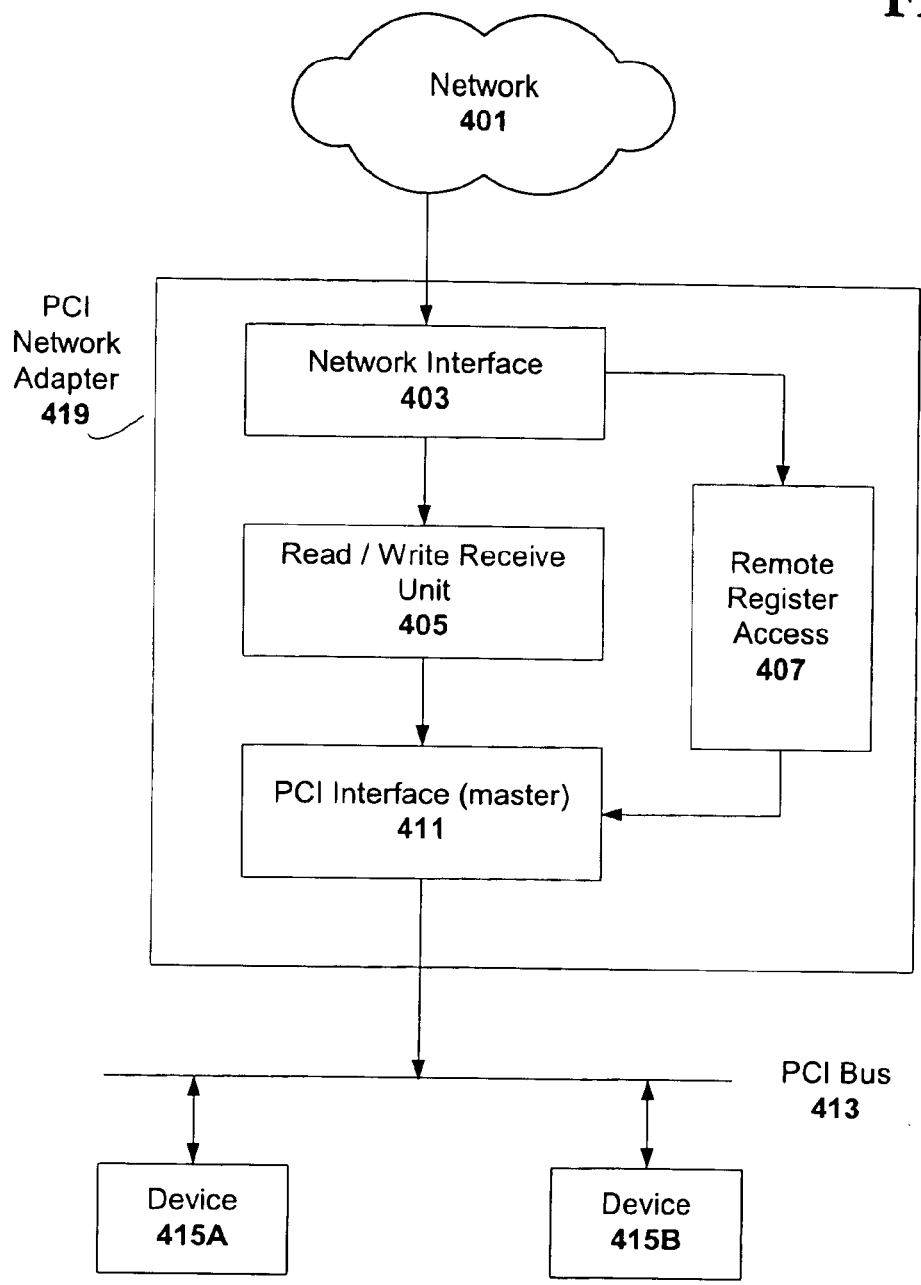
FIG. 4 is a block diagram illustrating a PCI network adapter structure on a remote node according to one embodiment of the present invention.

FIG. 4 is a block diagram illustrating a PCI network adapter structure on a remote node according to one embodiment of the present invention. The structure shown is generally referred to as PCI network adapter 419 and includes a PCI interface 411, a read/write receive unit 405, a network interface 403, and a remote register access 407. Each of these functional components can be implemented separately, or can be implemented together. Moreover, each component, whether alone or in combination with other components, can be implemented, for example, in software, hardware, firmware or any combination thereof.

Packets (e.g., request packets, CSA packets or Raw packets) from network 401 are received by network interface 403. For outgoing reply read data responsive to a received read request, network interface 403 also assembles reply packets (using network protocols) containing the reply read data for transmission over network 401. Read/write receive unit 405 stores and organizes the packets and or the packet information. In one embodiment, read/write receive unit 405 includes a FIFO queue structure for storing the packets. In an alternative embodiment, separate FIFO queue structures can store various components of the packet information. For example, one FIFO for storing read requests associated with their respective packets and one for storing write requests associated with their respective packets. Read/write receive unit 405 also maintains ordering rules associated with the read and write requests received. For example, if both a read and a write request are directed to the same destination node, the write request can be given priority over the read request thereby preventing the reading of stale data.

Read/write receive unit 405 also can request PCI interface 411 to execute various PCI commands (e.g., read and write commands). In response, PCI interface 411 executes the requested PCI commands. PCI interface 411 can also issue configuration commands in response to PCI configuration requests from remote register access 407. In one embodiment, remote register access 407 is implemented through message passing. PCI interface 411 may also include a buffer for storing requested reply read data that is to be transmitted to a requesting node. In this embodiment, PCI interface 411 is designated as master. This is because PCI interface 411 performs remote I/O master functions, such as read and write. PCI interface 411 is coupled to devices 415A and 415B via PCI bus 413.

Figure 5:
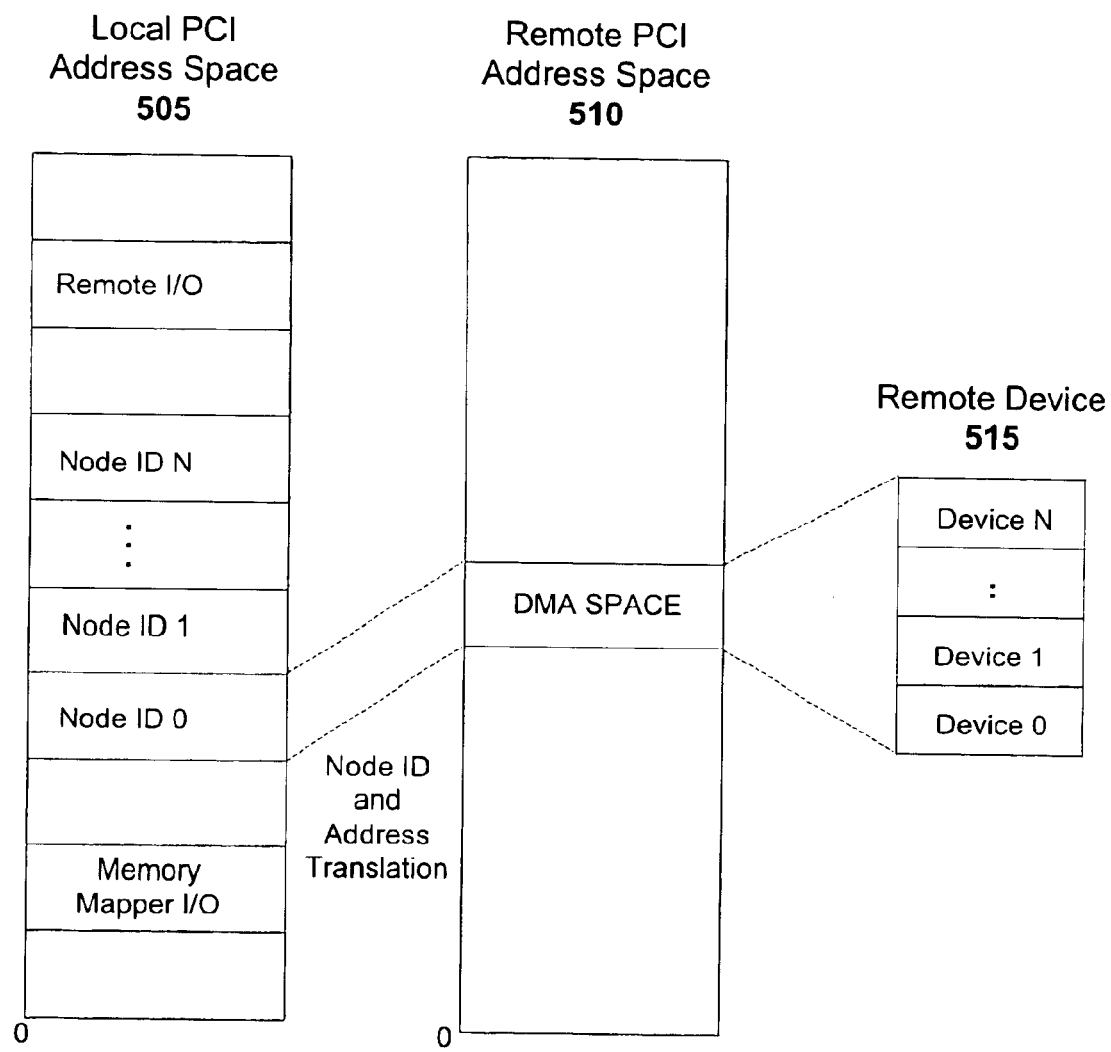
FIG. 5 is a pictorial diagram illustrating the mapping of an address space of a local PCI bus to a DMA space of a remote PCI bus according to one embodiment of the present invention.

FIG. 5 is a pictorial diagram illustrating the mapping of an address space of a local PCI bus to a direct memory access (DMA) space of a remote PCI bus according to one embodiment of the present invention. Local PCI address space 505 includes addresses of remote I/O devices as well as a memory mapper I/O. Additionally, local PCI address space 505 includes a logical node ID 0 through logical node ID N. Each of these node IDs are mapped to a DMA space in remote PCI address space 510 in each remote node. Destination node ID and destination address translation can be performed so as to derive the corresponding DMA space from a particular node ID. The DMA space then maps to a number of remote devices 515 on the remote PCI bus associated with remote PCI address space 510.

Figure 6:
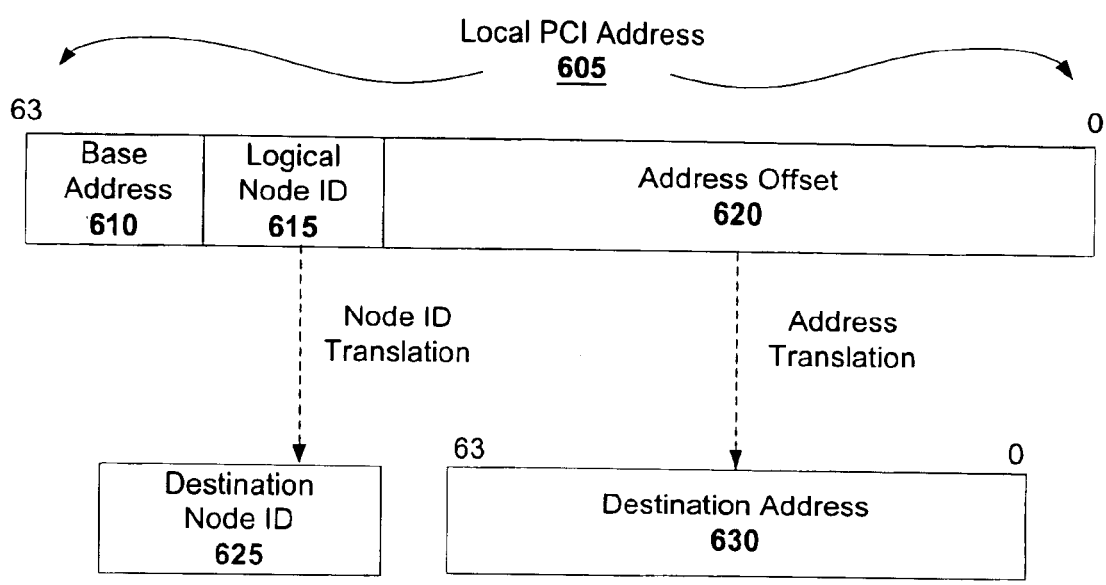
FIG. 6 is a pictorial diagram illustrating the destination node ID and destination address translation from a local PCI bus address in accordance with one embodiment of the present invention.

FIG. 6 is a pictorial illustrating the destination node ID and destination address translation from a local PCI bus address in accordance with one embodiment of the present invention. In the embodiment shown, local PCI address 605 is a 64 bit word that includes base address 610, logical node ID 615 and address offset 620. Logical node ID 615 is translated into destination node ID 625. Base address 610 and address offset 620 are translated into destination address 630. Destination address 630 is a 64 bit word in the embodiment. Destination node ID 625 and destination address 630 can then be provided to a read/write transfer unit (e.g., 313 of FIG. 3).

Figure 7A:
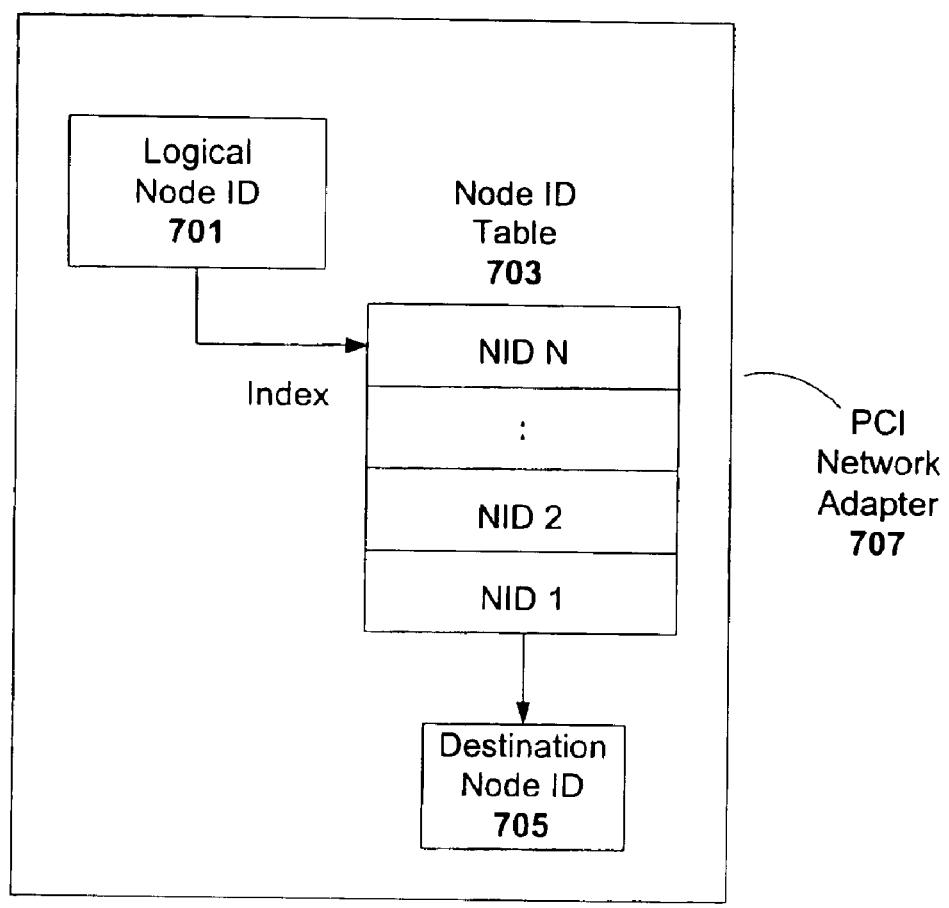
FIG. 7a is a pictorial diagram illustrating the translation of a destination node ID from a logical node ID of a local PCI bus address in accordance with one embodiment of the present invention.

FIG. 7a is a pictorial diagram illustrating the translation of a destination node ID from a logical node ID of a local PCI bus address in accordance with one embodiment of the present invention. Logical node ID 701 is received from the local PCI address space (not shown) by a local PCI network adapter 707. In this embodiment, PCI network adapter 707 includes a node ID table 703 having an index of destination node IDs (e.g., NID 1, NID 2 and NID N). Once logical node ID 701 is received, node ID table 703 can be identified, and a destination node ID corresponding to the index that matches the logical node ID 701 can be selected from the table. This selection yields destination node ID 705, which can then be provided to the read/write transfer unit (e.g., 313 of FIG. 3).

Figure 7B:
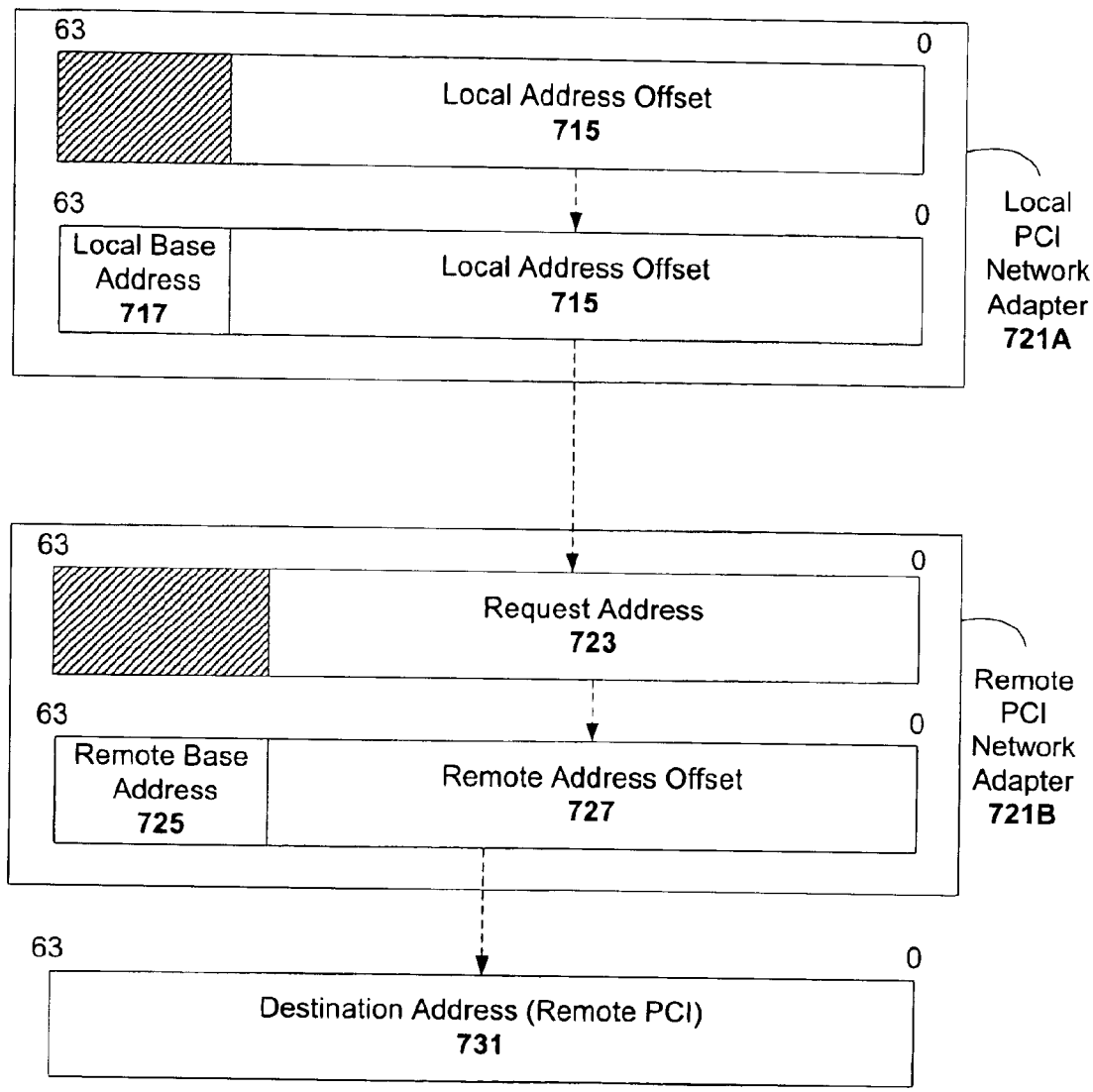
FIG. 7b is a pictorial diagram illustrating the translation of a destination address from a base address and address offset of a local PCI bus address in accordance with one embodiment of the present invention.

FIG. 7b is a pictorial diagram illustrating the translation of a destination address from a base address and address offset of a local PCI bus address in accordance with one embodiment of the present invention. Local PCI network adapter 721A receives local base address 717 and local address offset 715 from the local PCI address space. In this embodiment, local base address 717 and local address offset 715 are included in a 64 bit word. Request address 723 of remote PCI network adapter 721B is logically generated from local base address 717 and local address offset 715. This request address 723 is then modified by remote base address 725. Destination address 731 of the remote PCI is logically generated from remote address offset 727 and request address 723, as modified by remote base address 725. In this embodiment, destination address 731 is a 64 bit word. This destination address 731 can then be provided to the read/write transfer unit (e.g., 313 of FIG. 3).

Figure 8:
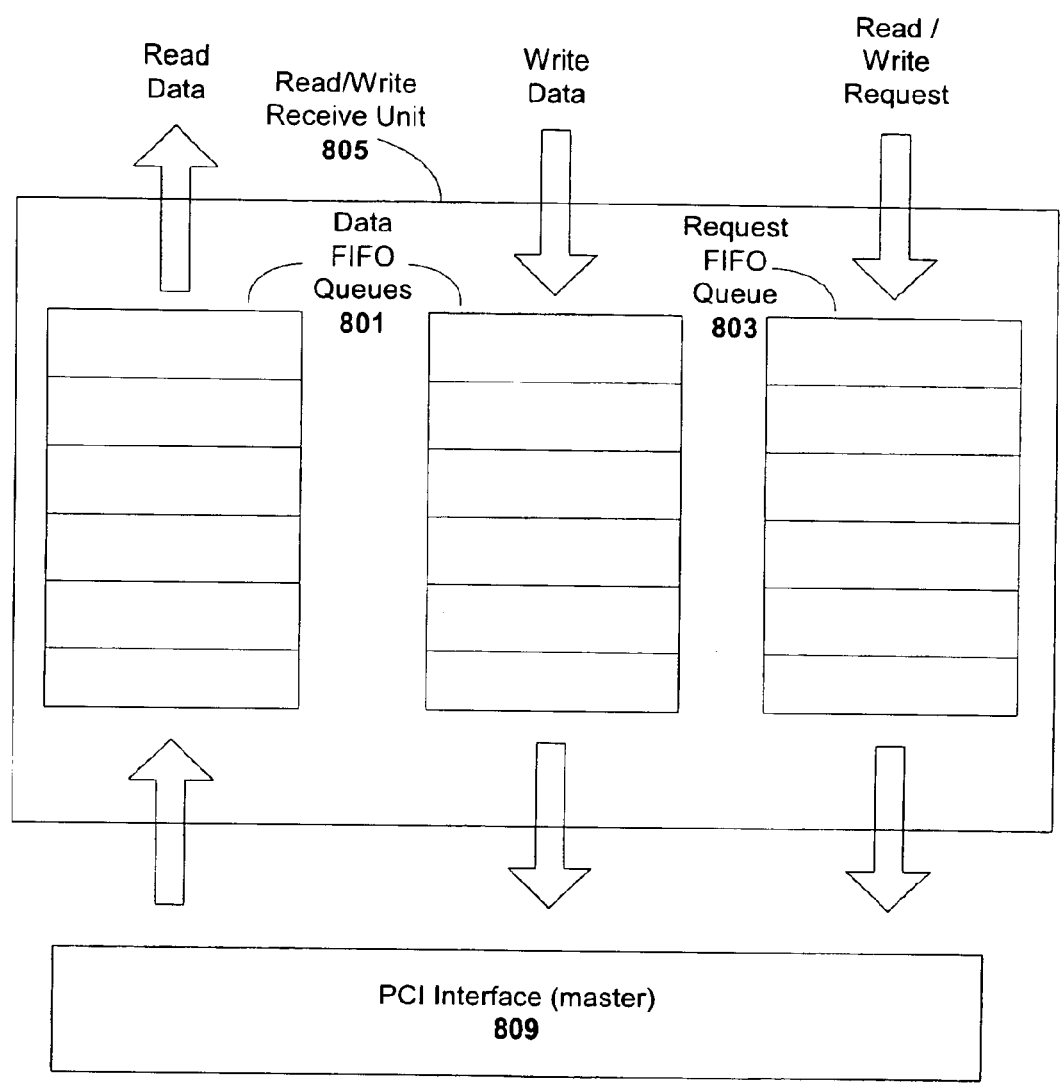
FIG. 8 is a pictorial diagram illustrating a read and write receive unit in accordance with one embodiment of the present invention.

FIG. 8 is a pictorial diagram illustrating a read and write receive unit in accordance with one embodiment of the present invention. Read/write receive unit 805 is included in a PCI network adapter, and stores packet data received by the network interface of that PCI network adapter as shown, for example, in FIG. 4. In the embodiment shown, read/write receive unit 805 includes data FIFO queues 801. The left-most data FIFO queue 801 is for storing reply read data received from PCI interface 809. This read data can then be transmitted to a remote node that requested the read. The right-most data FIFO queue 801 is for storing write data received from the network via a network interface (not shown). Request FIFO queue 803 is for storing read and write requests received from the network. Thus, read/write receive unit 805 maintains ordering rules by maintaining order of reads, maintaining order of writes, and any corresponding data, and allowing writes to bypass reads (to prevent the reading of stale data). Read/write receive unit 805 also can request PCI interface 809 to execute various PCI commands (e.g., read and write commands) based on the requests stored in request FIFO queue 803.

FIG. 9 is a block diagram illustrating remote register access in accordance with one embodiment of the present invention. In this embodiment, remote register access is implemented using a local CSA 901 included in a local PCI network adapter, and a remote CSA 903 included in a remote PCI network adapter. In this embodiment, CSA 901 and 903 are register access mechanisms using message passing as described above. FIGS. 3 and 4 illustrate example embodiments of how the local and remote register access mechanisms, respectively, couple with other units 905 of a PCI network adapter. A request for remote access is received by local CSA 901 from the local PCI interface (not shown). In one embodiment, the request is generated by software in response to, for example, message passing or a raw packet launch mechanism. A CSA packet is generated containing a destination node ID, remote register address, and a PCI command, such as read or write, that corresponds to the remote access request. This CSA packet can then be transmitted over the network via a network interface (not shown) also included in the local PCI network adapter.

The request packet is then received by remote CSA 903 (e.g., via a network interface included in the remote PCI network adapter). Remote CSA 903 then provides configuration requests to PCI interface 907, which in turn can execute the corresponding PCI configuration commands to PCI bus 909. Remote CSA 903 also can provide reply packets to local CSA 901 via the network and respective network interfaces. Such reply packets might include, for example, reply read data from an accessed register or status information about a particular request or register.

Figure 10A:
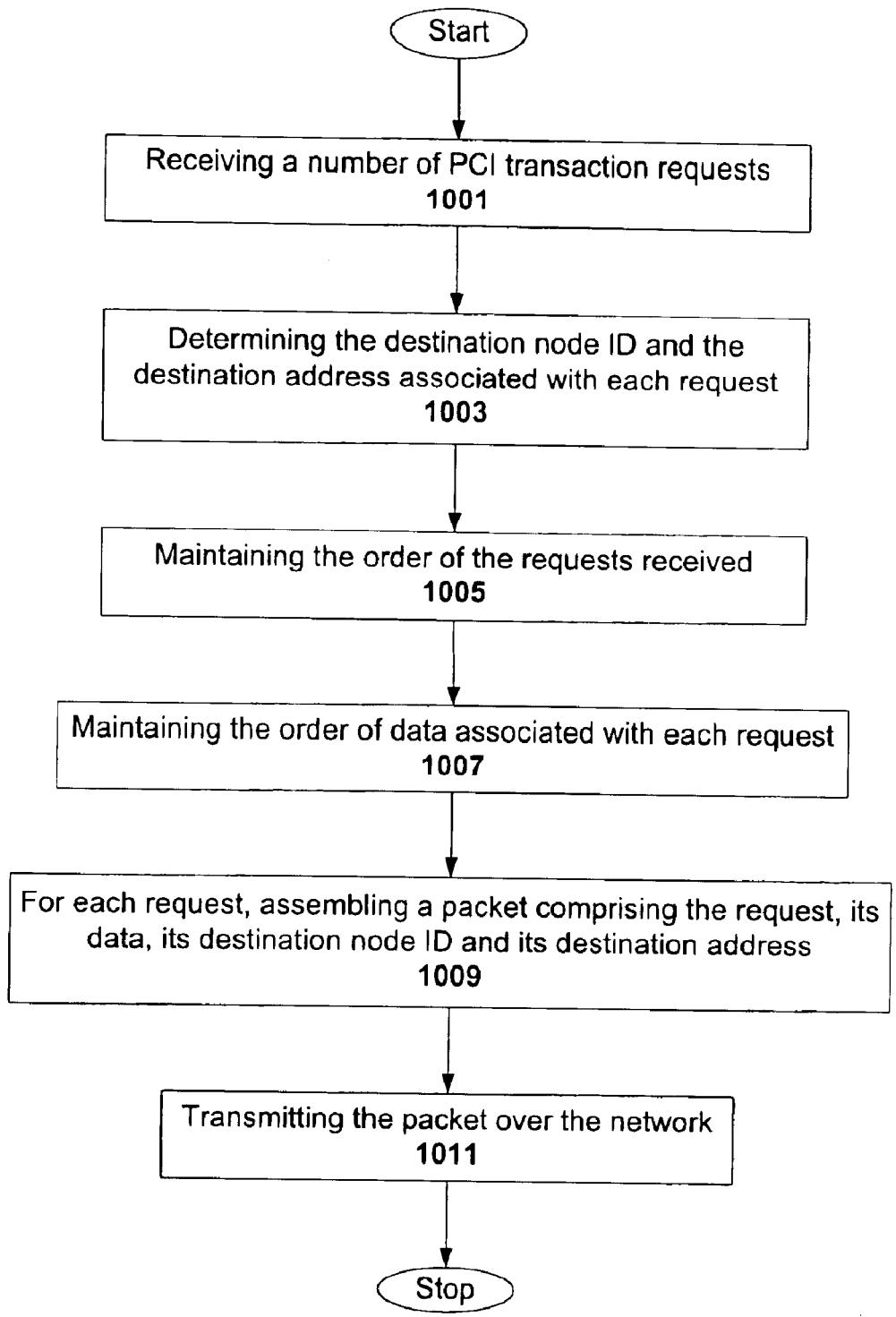
FIG. 10a is a flowchart illustrating a method for processing a write transaction request from a local PCI environment over a network in accordance with one embodiment of the present invention.

FIG. 10a is a flowchart illustrating a method for processing a write transaction request from a local PCI environment over a network in accordance with one embodiment of the present invention. This method begins by receiving 1001 a number of a PCI transaction requests (e.g., two write requests or just one write request). The method continues with determining 1003 the destination node ID and the destination address associated with each request. In one embodiment, the destination node ID and destination address are derived from the local PCI address space as explained above. The method continues with maintaining 1005 the order of the requests received, as well as maintaining 1007 the order of data associated with each of those requests. In one embodiment, this can be accomplished using FIFO queue structures. For each request, the method continues with assembling 1009 a packet comprising the write request, its destination node ID and its destination address. This can be accomplished, for example, using network protocols. Then, the method proceeds with transmitting 1011 the packet over the network.

Figure 10B:
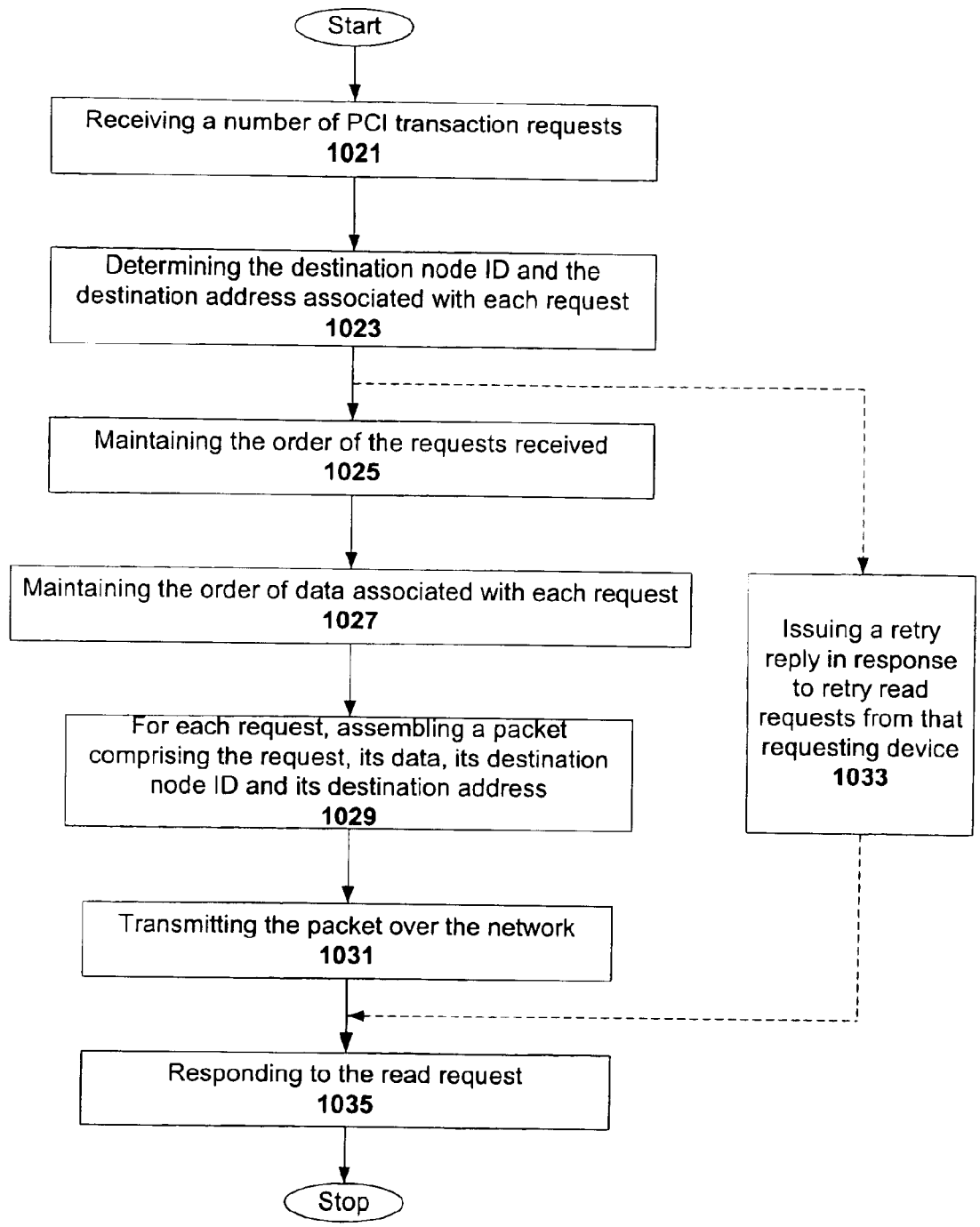
FIG. 10b is a flowchart illustrating a method for processing a read transaction request from a local PCI environment over a network in accordance with one embodiment of the present invention.

FIG. 10b is a flowchart illustrating a method for processing a read transaction request from a local PCI environment over a network in accordance with one embodiment of the present invention. This method begins by receiving 1021 a number of a PCI transaction requests (e.g., two read requests or just one read request). The method continues with determining 1023 the destination node ID and the destination address associated with each request. In one embodiment, the destination node ID and destination address are derived from the local PCI address space as explained above. The method continues with maintaining 1025 the order of the requests received, as well as maintaining 1027 the order of data associated with each of those requests. In one embodiment, this can be accomplished using FIFO queue structures. For each request, the method continues with assembling 1029 a packet comprising the request, its data, its destination node ID and its destination address. This can be accomplished, for example, using network protocols. Then, the method proceeds with transmitting 1031 the packet over the network. Running in parallel with steps 1025 through 1031, the method can also include issuing 1033 a retry reply to the requesting device in response to retry read requests from that requesting device. Once the read data has received (e.g., fetched from across the network), the method continues with responding 1035 to the read request (whether it be the original read request, or a retry of the original read request).

Figure 10C:
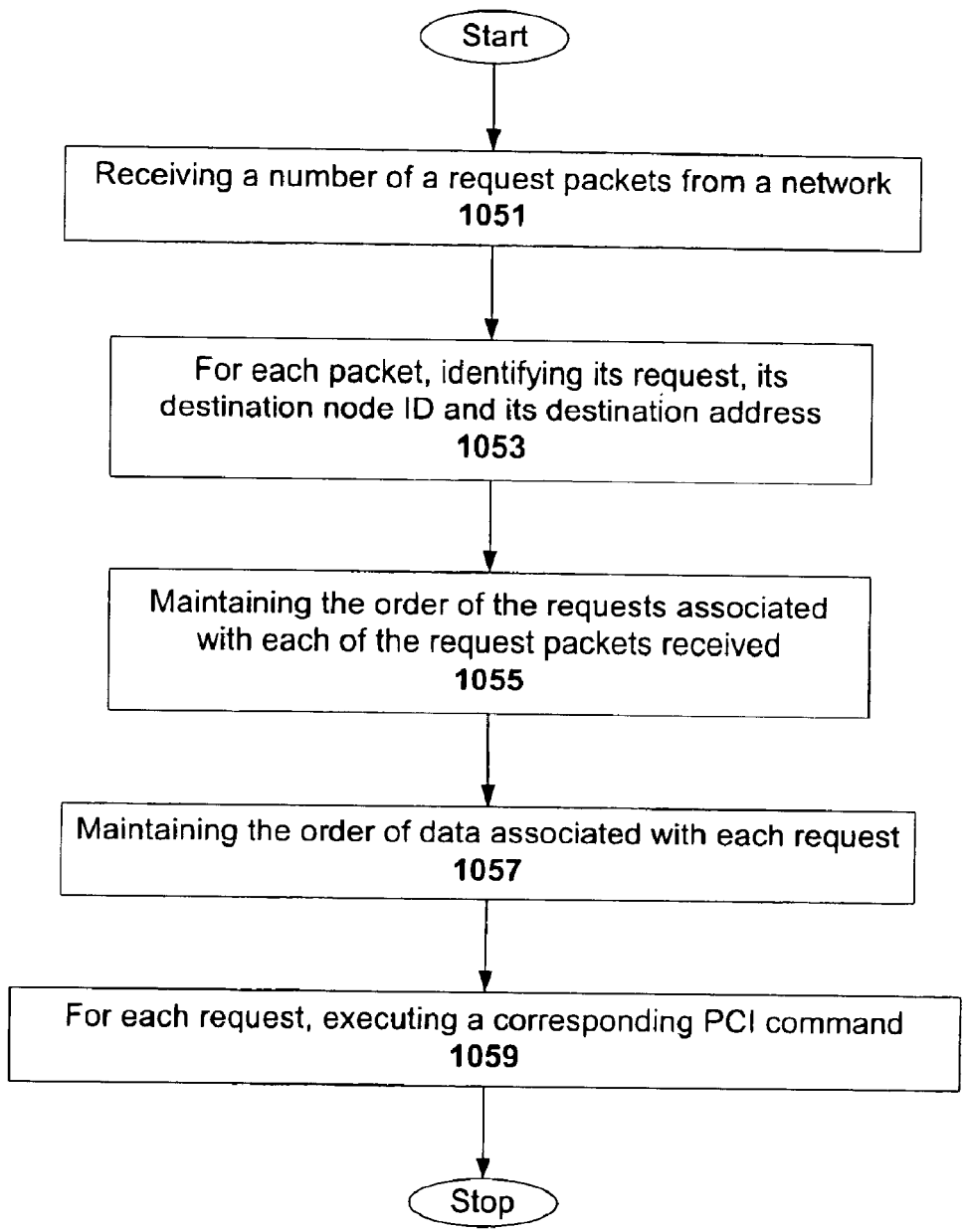
FIG. 10c is a flowchart showing a method for processing a transaction request from a network to a remote PCI environment in accordance with one embodiment of the present invention.

FIG. 10c is a flowchart showing a method for processing a transaction request from a network to a remote PCI environment in accordance with one embodiment of the present invention. The method begins by receiving 1051 a number of a request packets from the network. For each packet, the method includes identifying 1053 the request, the destination node ID and the destination address associated with the packet. Any data (e.g., write and read data) associated with the packet can be identified as well. The method proceeds with maintaining 1055 the order of the requests associated with each of the request packets received, as well as maintaining 1057 the order of data associated with each of those requests. In one embodiment, this can be accomplished using FIFO queue structures: one for read data, one for write data and one for requests (e.g., read or write). In such an embodiment, write requests can be given priority over read requests to prevent the reading of stale data. For each request, the method further includes executing 1059 a corresponding PCI command, such as a read or write. If the PCI command is a read, the method might further include receiving and storing the reply read data so that it can be assembled into a packet and transmitted over the network to the requesting node.

The foregoing description of the embodiments of the invention has been presented ID for the purposes of illustration and description. It is not intended to be exhaustive or to limit the invention to the precise form disclosed. Many modifications and variations are possible in light of the above teaching as will be understood by those skilled in the art. It is intended that the scope of the invention be limited not by this detailed description, but rather by the claims appended hereto.

What is claimed is:

1. A method for communicating transaction request information from a PCI environment over a network, the method comprising:

receiving a number of transaction requests from the PCI environment;

determining a destination node ID and a destination address associated with each transaction request;

maintaining an order of the transaction requests received;

maintaining an order of data associated with each of the transaction requests;

for each transaction request, assembling a packet including a request, a destination node ID and a destination address; and transmitting the packet to the network;

wherein maintaining the order of the transaction requests and maintaining the order of data are accomplished using a first FIFO queue structure for read data, a second FIFO queue structure for write data and a third FIFO queue structure for the transaction requests.

2. The method of claim 1 wherein the determining step includes translating the destination node ID and destination address from a PCI address space of the PCI environment.

3. The method of claim 1 wherein the determining step includes mapping a remote DMA space from a logical node ID included in a PCI address space of the PCI environment, the DMA space corresponding to a number of remote memory devices.

4. The method of claim 1, wherein one of the transaction requests received from the PCI environment is an original read request, the method further comprising:

responsive to not having received the read data associated with the original read request, issuing a retry reply to the device in response to receiving a retry of the original read request from the device thereby requiring the device to continue to retry the original read request; and responsive to receiving the read data associated with the original read request, and responsive to receiving a retry of the original read request from the device, issuing the read data to the device.

5. The method of claim 4 further comprising:

generating a force read retry signal that triggers the issuing of the retry reply to the device.

6. The method of claim 1 further comprising:

determining a number of transaction requests that have a same destination node.

7. The method of claim 1 wherein the determining step includes deriving the destination node ID from a node ID table, each entry in the table indexed according to a logical node ID included in a PCI address space of the PCI environment.

8. A method for communicating request packet information from a network to a PCI environment, the method comprising:

receiving a number of a request packets from the network;

for each request packet, identifying a request, a destination node ID and a destination address associated with the packet;

maintaining an order of the requests associated with each of the request packets received;

maintaining an order of data associated with each of the request packets received; and for each request packet, processing the associated request, wherein maintaining the order of the requests and maintaining the order of data are accomplished using a first FIFO queue structure for read data, a second FIFO queue structure for write data and a third FIFO queue structure for the requests.

9. The method of claim 8 wherein the steps of maintaining the order of the requests and maintaining the order of data are accomplished using FIFO queue structures.

10. The method of claim 8 further comprising:

responsive to a read request packet and a write request packet both having a same destination node ID, processing the write request packet before processing the read request packet.

11. The method of claim 8 further comprising:

responsive to receiving a read request packet, receiving read data from the PCI environment;

assembling that read data into a read reply packet; and transmitting the read reply packet over the network.

12. The method of claim 8 wherein processing step includes executing a PCI command corresponding to the request.

13. The method of claim 12 wherein the corresponding PCI command is one of a read command, a write command or a status inquiry command.

14. A system for communicating transaction request information from a PCI environment over a network, the system comprising:

a PCI interface for receiving transaction requests from the PCI environment and for determining a destination node ID and destination address a PCI address associated with each transaction request received;

a transfer unit operatively coupled to the PCI interface for maintaining an order of the transaction requests received, and for maintaining an order of data associated with each of the transaction requests; and a network interface coupled to the transfer unit for assembling a request packet for each transaction request, each request packet including a request, a destination node ID and a destination address;

wherein the transfer unit maintains the order of the transaction requests and maintains the order of data using a first FIFO queue structure for read data, a second FIFO queue structure for write data and a third FIFO queue structure for the transaction requests.

15. The system of claim 14 wherein the PCI interface includes a translator unit for determining the destination node ID and destination address from a PCI address space of the PCI environment.

16. The system of claim 14 wherein the PCI interface includes a mapping means implemented in software for mapping a remote DMA space from a logical node ID included in a PCI address space of the PCI environment, the remote DMA space corresponding to a number of remote memory devices.

17. The system of claim 14 wherein the PCI interface includes a table of destination node IDs, each destination node ID in the table being indexed according to a logical node ID included in a PCI address space of the PCI environment.

18. The system of claim 14 wherein one of the transaction requests received by the PCI interface is an original read request from a device included in the PCI environment, and wherein in response to read data associated with the original read request not having been received by the system, the system issues a retry reply to the device in response to receiving a retry of the original read request from the device thereby requiring the device to continue to retry the original read request.

19. The system of claim 18 wherein in response to the system receiving the read data associated with the original read request, and responsive to the system receiving a retry of the original read request from the device, the read data is issued to the device.

20. The system of claim 18 wherein in response to the read data associated with the original read request not having been received by the transfer unit, the transfer unit signals the interface with a force read retry signal that indicates to the interface that the transfer unit has not received the read data associated with the original read request, the force read retry signal causing the interface to issue a retry reply to the device in response to receiving a retry of the original read request from the device thereby requiring the device to continue to retry the original read request.

21. The system of claim 20 wherein in response to the read data associated with the original read request having been received by the transfer unit, the transfer unit signals the interface by suppressing the force read retry signal thereby indicating to the interface that the transfer unit has received the read data associated with the original read request.

22. The system of claim 21 wherein in response to the interface receiving a retry of the original read request, the transfer unit transfers the read data associated with the original read request to the device via the interface.

23. A system for communicating request packet information from a network to a PCI environment, the system comprising:
 a network interface for receiving a number of a request packets from the network, and for each request packet, identifying a request, data, a destination node ID and a destination address associated with the packet;
 a receive unit for maintaining an order of the requests associated with each of the request packets received, and for maintaining an order of data associated with each of the request packets received; and
 a PCI interface for processing the request associated with each request packet,
 wherein the receive unit maintains the order of the requests and maintains the order of data using a first FIFO queue structure for read data, a second FIFO queue structure for write data and a third FIFO queue structure for the requests.

24. The system of claim 23 wherein the PCI interface includes a buffer for receiving read data from the PCI environment responsive to a read request, and wherein the network interface assembles read reply packets that include the read data, and transmits the read reply packets over the network.

25. The system of claim 23 wherein the processing performed by the PCI interface includes executing a PCI command corresponding to the request.

26. The system of claim 25 wherein the corresponding PCI command is one of a read command, a write command or a status inquiry command.

* * * * *